June 18, 1974
V. IONESCU
APPARATUS FOR THE PURIFICATION OF AIR WITH A MERCURY VAPOR CONTENT
Filed May 10, 1971
3,817,713
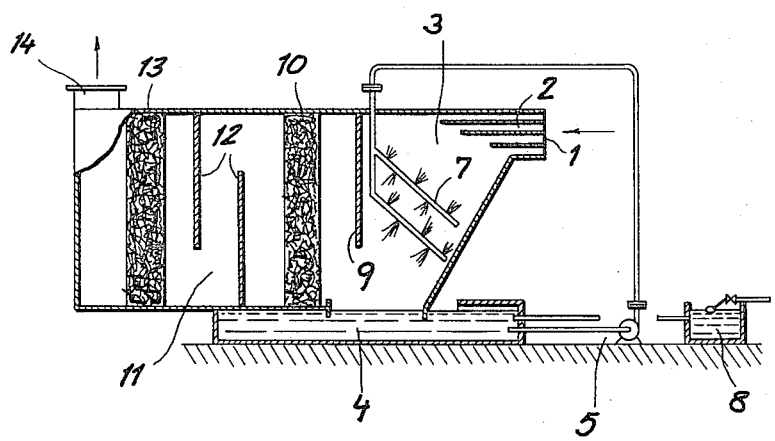

United States Patent Office 3,817,713
Patented June 18, 1974

3,817,713
APPARATUS FOR THE PURIFICATION OF AIR WITH A MERCURY VAPOR CONTENT
Vasile Ionescu, Bucharest, Rumania, assignor to Institutul de Cercetari si Proiectari, Automatizari si Proiectari, Uzine si Instalatii Pentru Industria Electrotehnica, Bucharest, Rumania
Filed May 10, 1971, Ser. No. 141,925
Claims priority, application Rumania, May 13, 1970, 63,342
Int. Cl. B01j 1/14
U.S. Cl. 23—284                                                      1 Claim

ABSTRACT OF THE DISCLOSURE

An apparatus for the removal of mercury vapor from air containing same, which comprises introducing the air into the top of the first chamber which is larger at the top than at the bottom and subjecting the air therein to spray of aqueous sodium sulfide solution, the liquid being thereafter collected along the smaller floor of this chamber in a tank from which the sodium sulfide solution is circulated. The air is then induced to flow in an undulating path around vertical baffles and through filters which trap (hold back) any residual droplets before being released to the atmosphere.

---

The invention relates to an apparatus for the purification of air containing mercury vapor, from industrial plants for the manufacture of bulbs, mercury vapor lamps, fluorescent tubes as well as control and measuring instruments.

Earlier processes for recovering mercury vapor by its condensation in installation employed ring filters and cooling towers and have the disadvantage of excessively large size.

Other methods for the removal of mercury vapor from air pass the impure air over a catalyst bed made up of active carbon or aluminum result in mercury sulfide and sulfur deposition. These methods have the disadvantage that they are expensive and require repeated regeneration of the catalyst.

The present invention eliminates the above disadvantages and achieves a rapid purification of mercury-containing air in an installation of reduced volume by the use of a solution of 10% sodium sulfide which is pulverized (atomized) in the space through which the air current is guided in an apparatus having a chamber whose top surface is larger than the bottom one and provided with a system of spraying nozzles and a chamber for retaining the droplet; the latter chamber is provided with baffles and is separated from the first chamber by a filter.

The drawing illustrates, in its sole Figure, a diagrammatic longitudinal section through an apparatus according to the invention for removal of mercury vapor.

Mercury vapor contaminated air is passed in the direction of arrow A by a supply conduit 1 provided with vertically spaced horizontal parallel guiding blades into a chamber 3 whose bottom surface is smaller than its top surface. At the bottom part of the chamber 3 there is a tank 4 which contains an aqueous solution of 10% sodium sulfide and from which by a recirculating pump 5, the solution is transported through a conduit 6 and sprayed in the polluted air stream, by means of a spraying-nozzle system 7 at a flow rate of 0.75 liter/square meter/second.

For completion of the solution with water, there is provided near the tank 4 a water tank 8.

After spraying treatment, the air current which is deflected around a baffle 9 extending vertically downwardly toward the floor of the chamber 3 passes through a filter 10 extending across the entire cross-section of the flow path and enters into a chamber 11 provided with horizontally-spaced vertical baffles 12 extending alternately upwardly and downwardly in overlapping relation for holding back the droplets entrained with air which drip onto the floor of the chamber near the tank 4.

From chamber 11, the purified air after it has passed through the last filter 13 is vented by a discharge pipe 14.

The installation ensures an effective purification of the mercury vapor polluted air in an installation of reduced size which, in case of small air flows, can be mounted directly in the ventilating ductwork.

What is claimed is:

1. An apparatus for the removal of mercury vapor from contaminated air containing same, said apparatus comprising a housing forming a first and a second chamber successively traversable by the contaminated air, said first chamber having a relatively large upper portion and a relatively small lower portion; inlet means at said upper portion for admitting the contaminated air thereto; a droplet-hold back filter between said first and second chambers and traversable by the air passing from said first chamber to said second chamber; spray means in said first chamber for dispersing droplets of an aqueous solution of sodium sulfide into the air contained therein; baffle means in said second chamber for guiding the air traversing said mist filter along a tortuous path; a liquid-collecting tank beneath said first chamber; circulating means connecting said tank with said spray means for recirculating collected sodium sulfide solution into contact with air traversing said first chamber; guide means at said inlet for directing the air introduced into said first chamber generally horizontally along said upper portion thereof; a baffle extending downwardly from said upper portion of said first chamber but terminating above said tank and disposed between said spray means and said filter, said baffle means including alternately upwardly and downwardly extending horizontally spaced vertical baffles in overlapping relationship in said second chamber; and another droplet hold back filter across said second chamber and traversed by the air discharged therefrom.

References Cited

UNITED STATES PATENTS

| | | | |
|---|---|---|---|
| 1,580,451 | 4/1926 | Sperr, Jr. | 423—220 |
| 1,167,909 | 1/1916 | McDonald | 261—119 |
| 585,568 | 6/1897 | Greiwe | 55—260 |
| 2,239,595 | 4/1941 | Cummings, Jr. | 55—257 |
| 2,045,519 | 6/1936 | Coutant | 261—115 |

EARL C. THOMAS, Primary Examiner

U.S. Cl. X.R.

23—253 R; 55—228, 257, 260; 261—115, 119; 423—210